(12) United States Patent
Vogt et al.

(10) Patent No.: US 7,713,890 B2
(45) Date of Patent: May 11, 2010

(54) FLEXIBLE SHEET-LIKE COMPOSITES

(75) Inventors: Kirkland W. Vogt, Simpsonville, SC (US); Karl M. Gruenberg, Spartanburg, SC (US); John A. Sollars, LaGrange, GA (US); Carlton J. Senn, LaGrange, GA (US); Stophon F. Waddell, Easley, SC (US); Kasey R. Myers, Auburn, AL (US)

(73) Assignee: Milliken & Company, Spartanburg, SC (US)

( * ) Notice: Subject to any disclaimer, the term of this patent is extended or adjusted under 35 U.S.C. 154(b) by 804 days.

(21) Appl. No.: 11/508,623

(22) Filed: Aug. 23, 2006

(65) Prior Publication Data

US 2007/0128963 A1 Jun. 7, 2007

Related U.S. Application Data

(60) Provisional application No. 60/710,442, filed on Aug. 23, 2005.

(51) Int. Cl.
*B32B 27/12* (2006.01)
*D04H 1/00* (2006.01)

(52) U.S. Cl. .................... 442/2; 442/286; 442/287; 442/292

(58) Field of Classification Search .............. 442/2, 442/286, 287, 292
See application file for complete search history.

(56) References Cited

U.S. PATENT DOCUMENTS

| 3,127,135 | A | 3/1964 | Burr et al. |
|---|---|---|---|
| 3,519,530 | A | 7/1970 | Struble, Jr. |
| 3,974,989 | A | 8/1976 | Goodfellow |
| 4,020,209 | A | 4/1977 | Yuan |
| 4,346,139 | A | 8/1982 | Osawa et al. |
| 5,011,183 | A | 4/1991 | Thornton et al. |
| 5,118,558 | A | 6/1992 | Mater et al. |
| 5,131,434 | A | 7/1992 | Krummheuer et al. |
| 5,161,479 | A | 11/1992 | Mahr |
| 5,277,230 | A | 1/1994 | Sollars, Jr. |
| 5,704,402 | A | 1/1998 | Bowen et al. |
| 5,921,287 | A | 7/1999 | Bowen et al. |
| 6,074,722 | A * | 6/2000 | Cuccias ................ 428/107 |
| 6,224,016 | B1 | 5/2001 | Lee et al. |

(Continued)

FOREIGN PATENT DOCUMENTS

EP   1 457 313   9/2004

OTHER PUBLICATIONS

"Predicting Mechanical Properties and Hand Values from the Parameters of Weave Structures," Textile Research Journal, vol. 75, No. 3, Mar. 2005, pp. 252-257.

*Primary Examiner*—Ula C Ruddock
(74) *Attorney, Agent, or Firm*—Cheryl J. Brickey

(57) ABSTRACT

Provided herein are various flexible sheet-like substrates that are lightweight, rupture or burst resistant, and suitable for use in constructing a variety of structures used in fluid-containment, especially gas containment, and other applications, and the processes by which such composites can be fabricated. In the most general case, the composites of this disclosure are comprised of a woven textile fabric to which has been laminated a flexible film. Two principal embodiments are disclosed: a first embodiment without a reinforcing layer, and a second embodiment with a structurally robust, bias-oriented reinforcing layer, preferably interposed between the fabric and the film.

20 Claims, 15 Drawing Sheets

U.S. PATENT DOCUMENTS

| | | |
|---|---|---|
| 6,463,699 B1 | 10/2002 | Bailey et al. |
| 6,655,253 B2 | 12/2003 | Uchida et al. |
| 6,656,993 B2 | 12/2003 | Akkapeddi et al. |
| 6,663,662 B2 | 12/2003 | Pacetti et al. |
| 6,670,047 B2 | 12/2003 | Nanba et al. |
| 6,720,097 B2 | 4/2004 | Ohkawa et al. |
| 6,737,753 B2 | 5/2004 | Kumar et al. |
| 6,791,510 B2 | 9/2004 | Watanabe et al. |
| 6,807,988 B2 | 10/2004 | Powell et al. |
| 2002/0016118 A1* | 2/2002 | Bebber et al. ............... 442/286 |

* cited by examiner

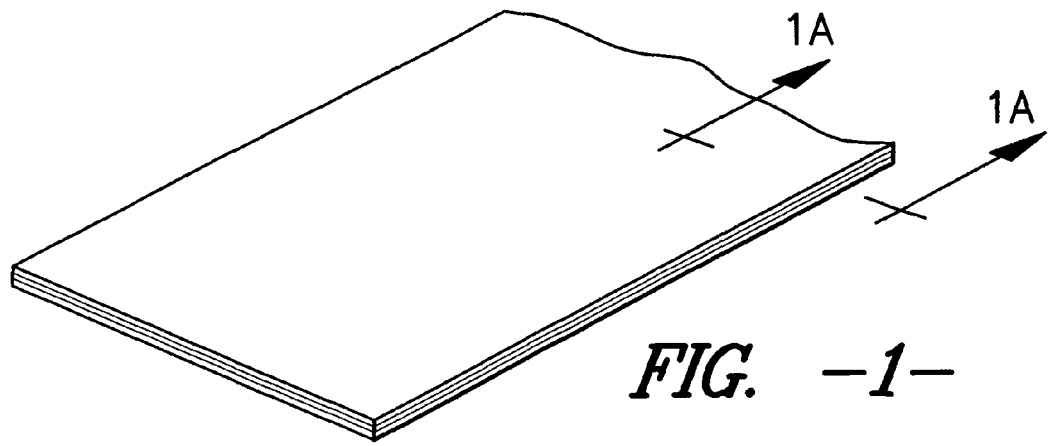
FIG. -1-
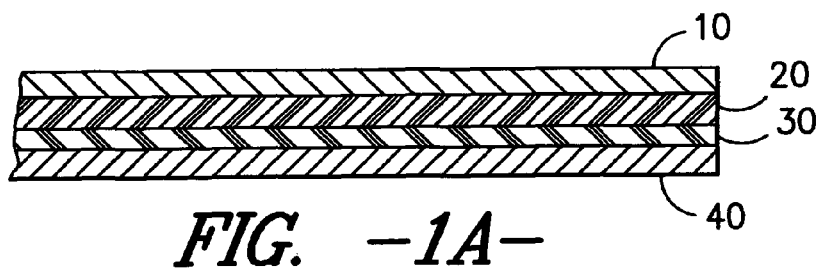
FIG. -1A-
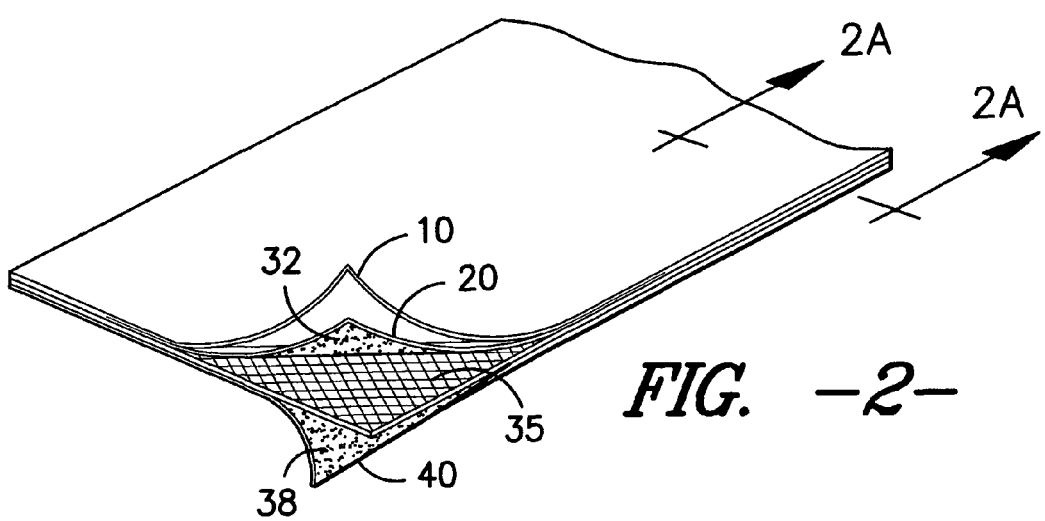
FIG. -2-
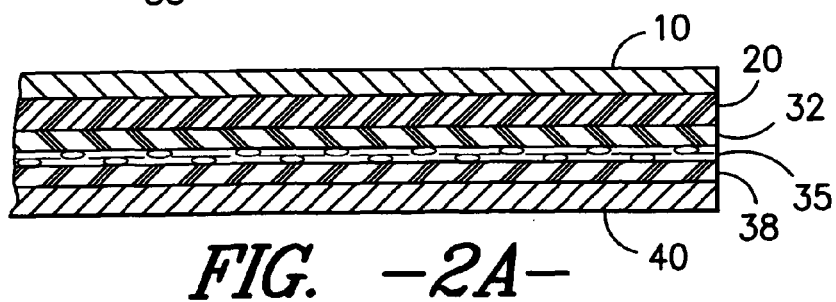
FIG. -2A-

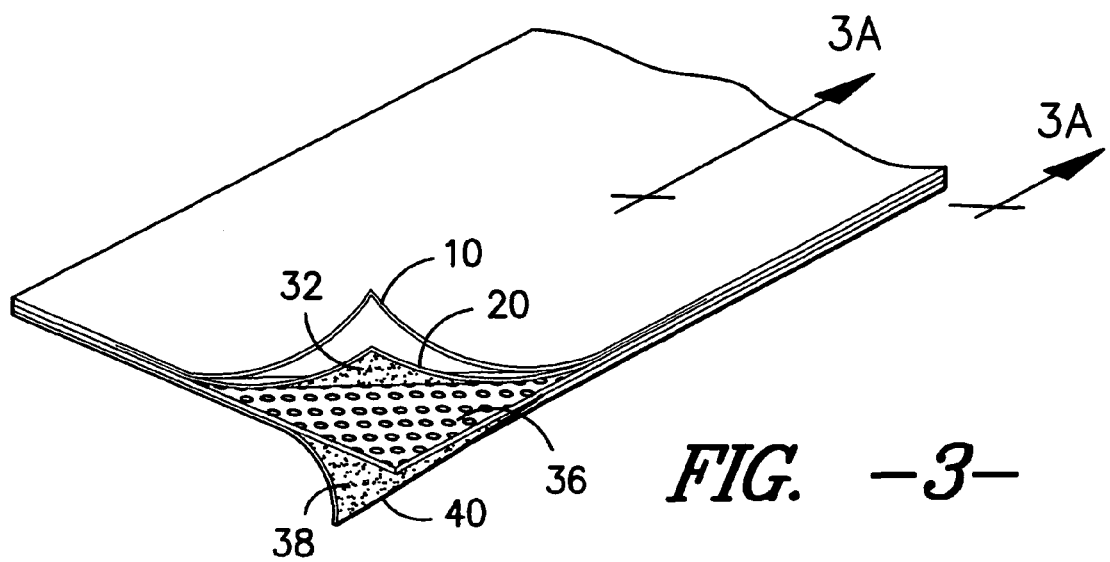
FIG. -3-
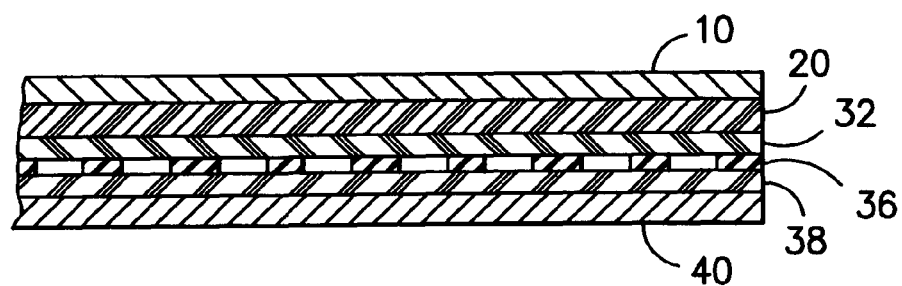
FIG. -3A-

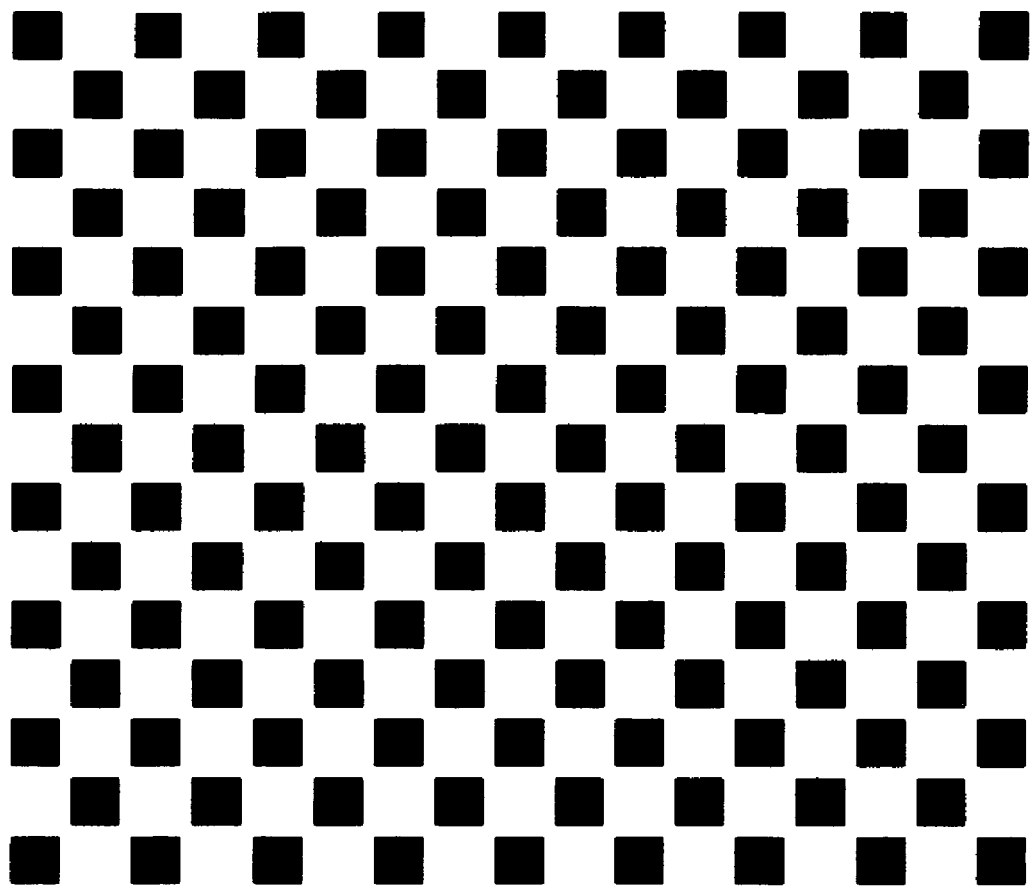
FIG. —4—

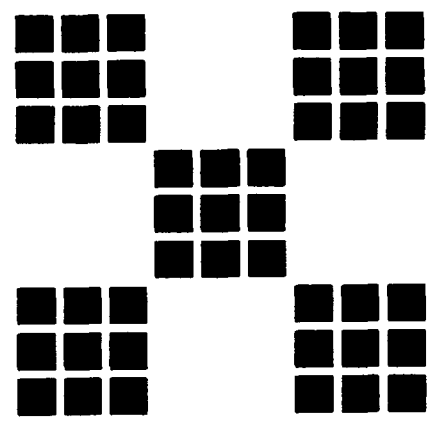
FIG. —5A—
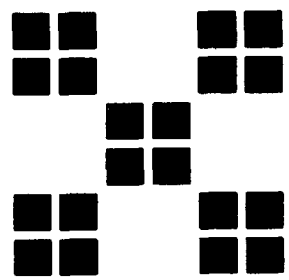
FIG. —5B—
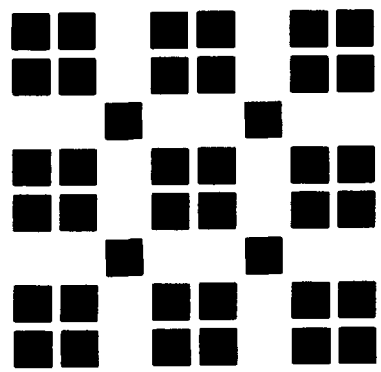
FIG. —5C—

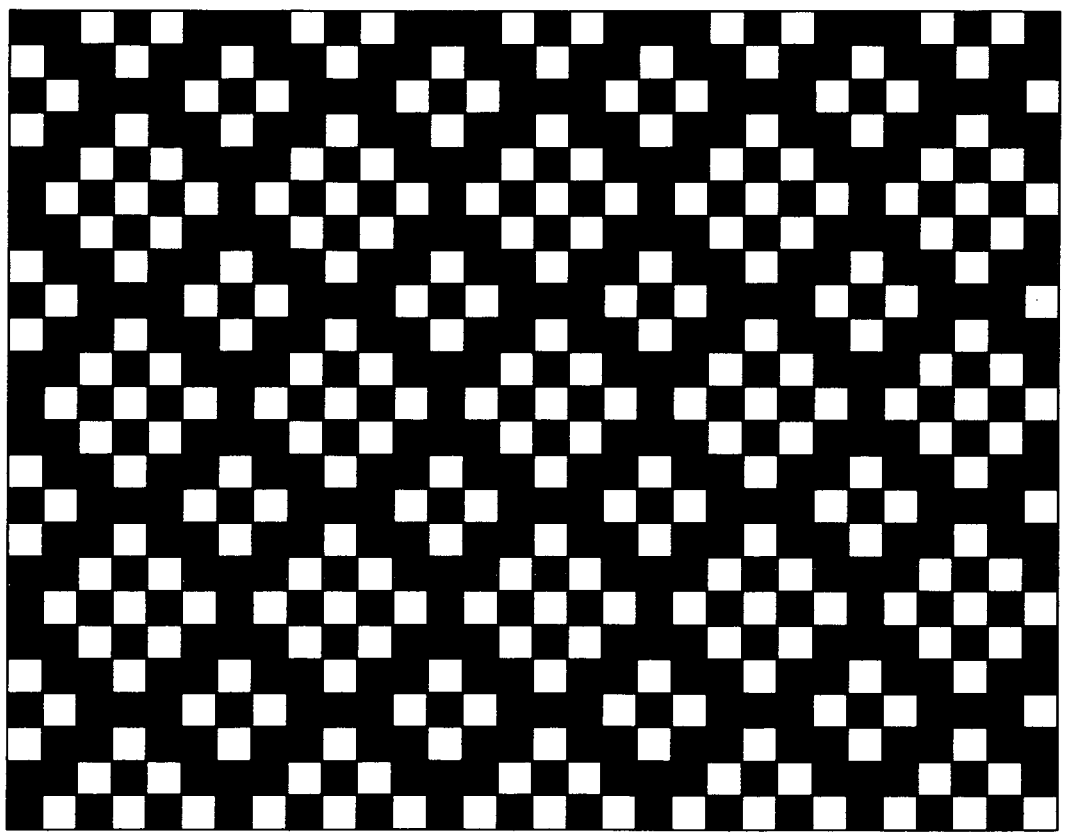
FIG. -6A-

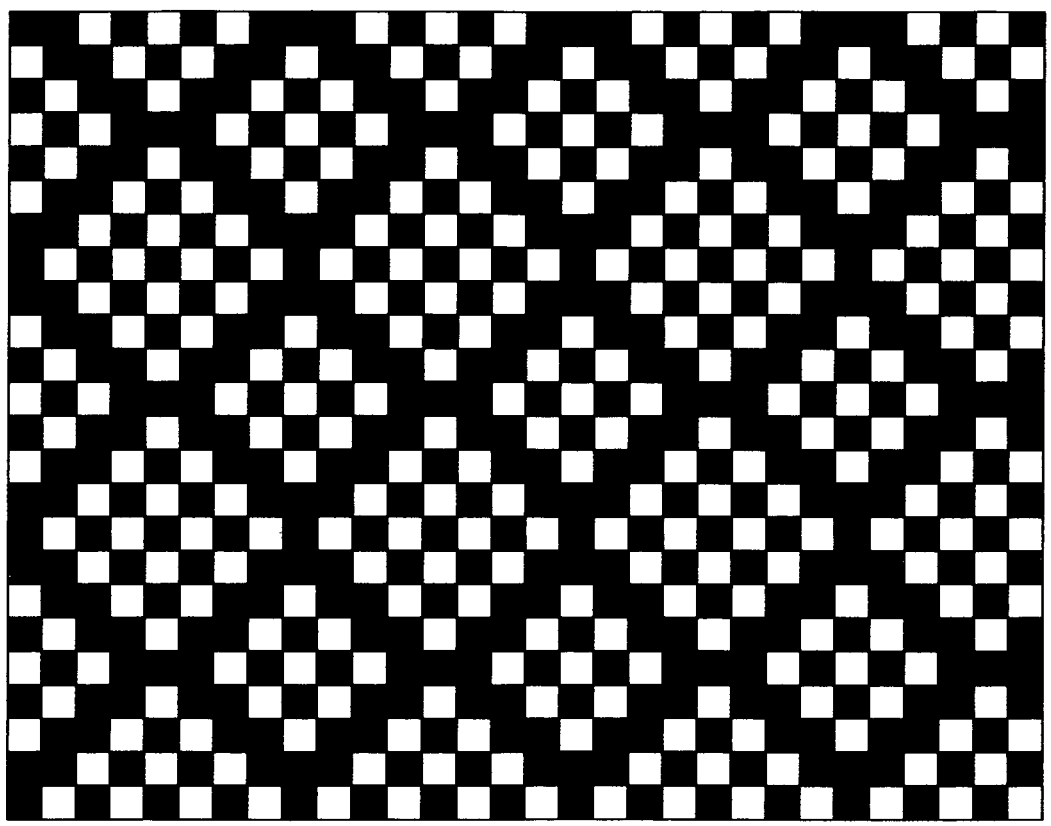
FIG. -6B-

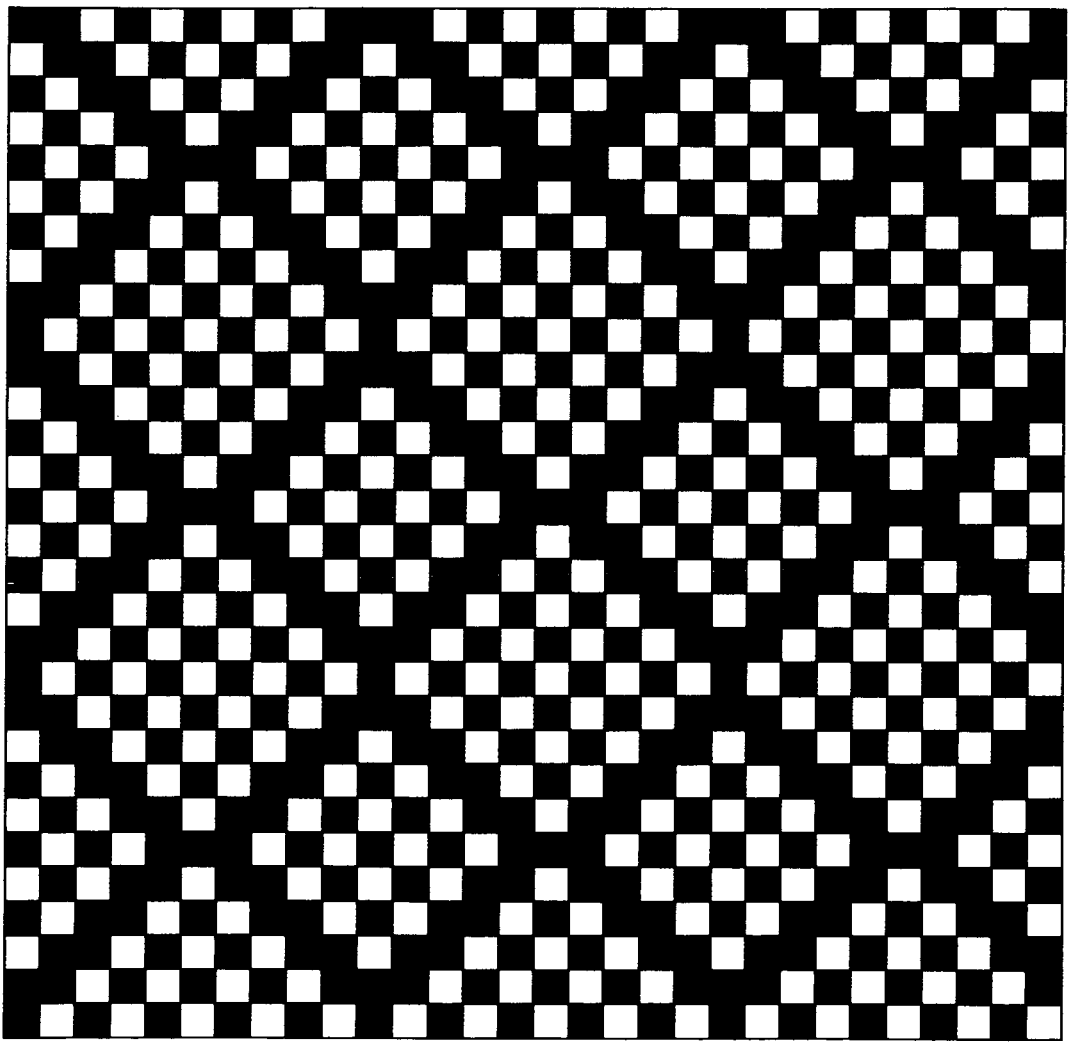
FIG. -6C-

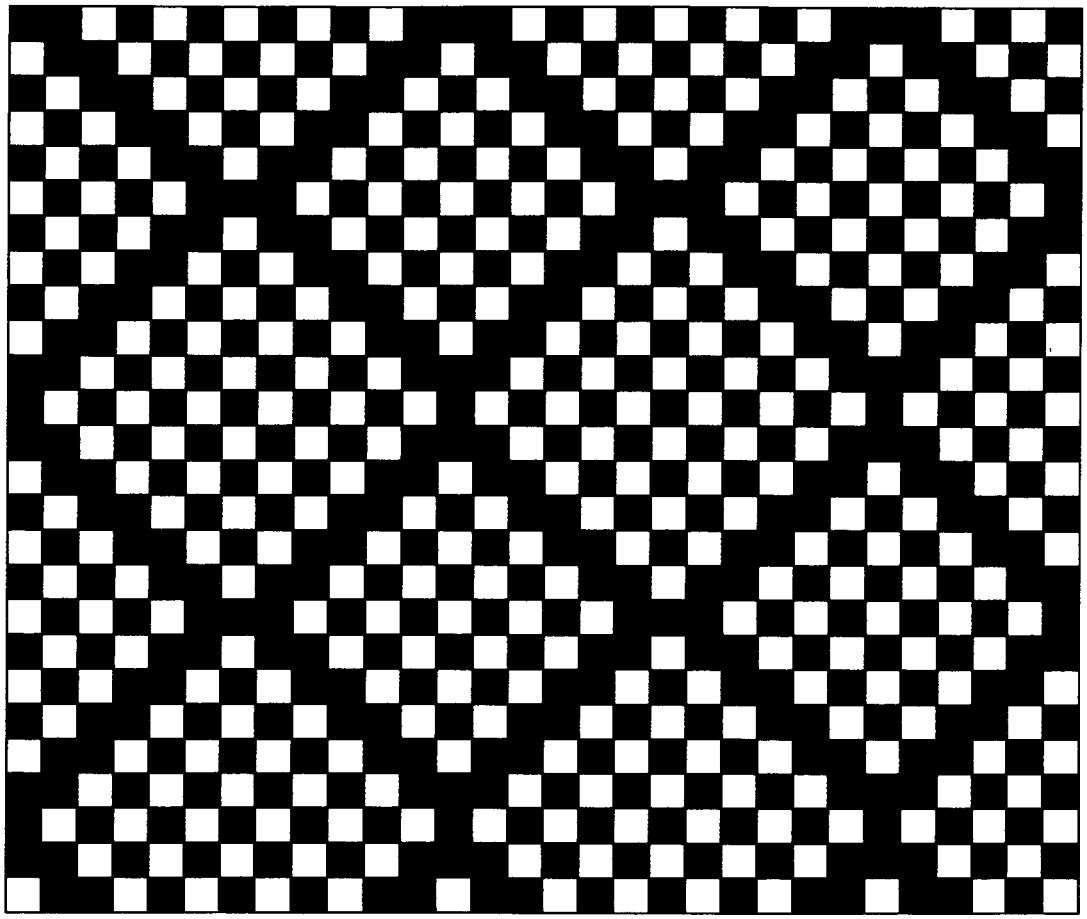
FIG. −6D−

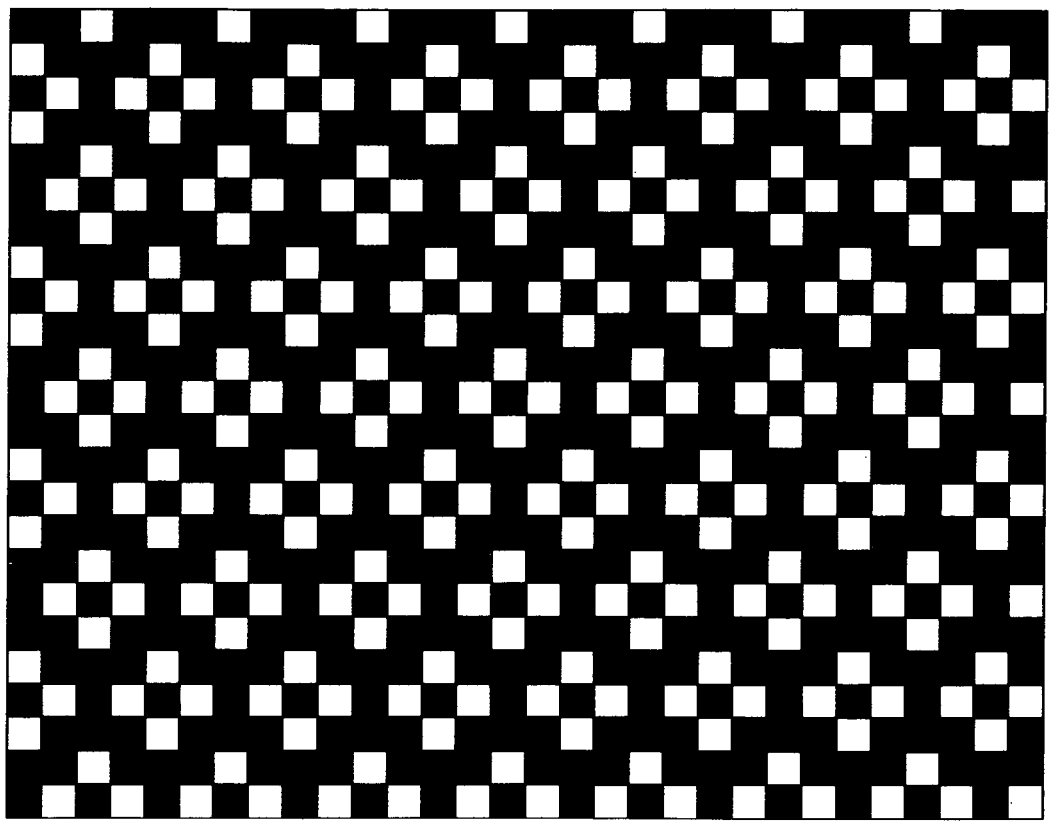
FIG. -7A-

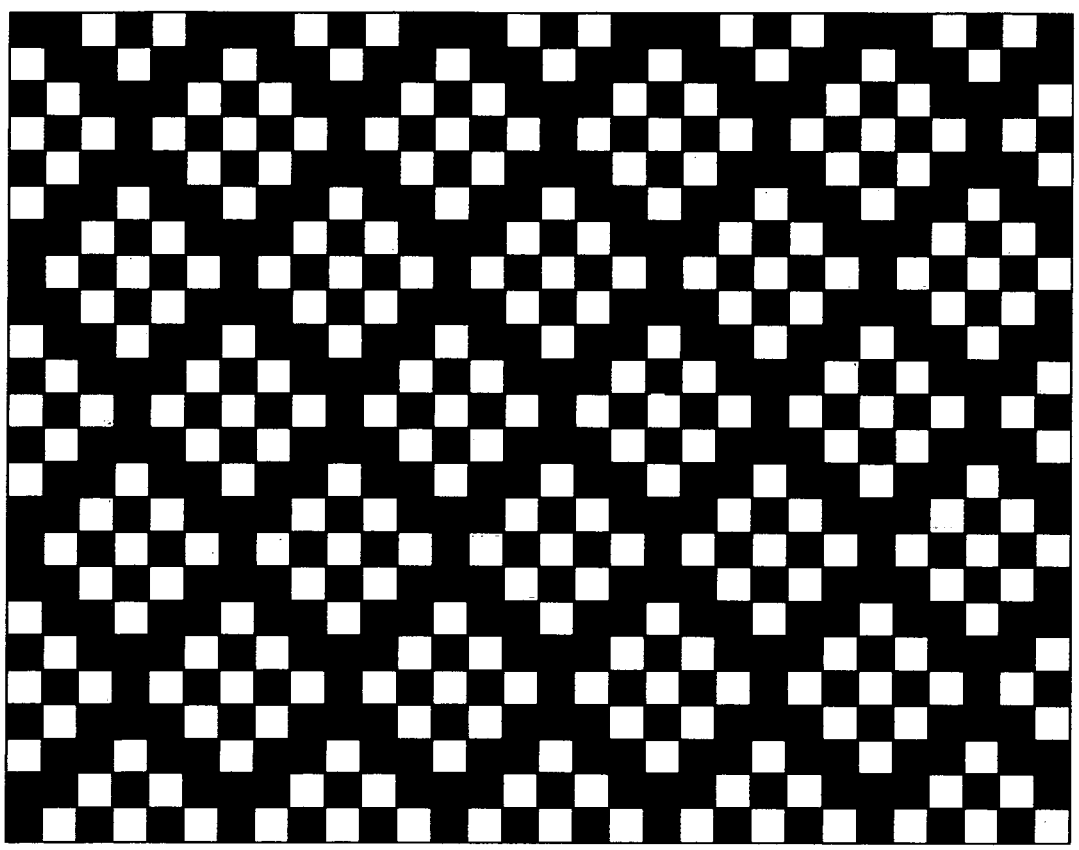
FIG. −7B−

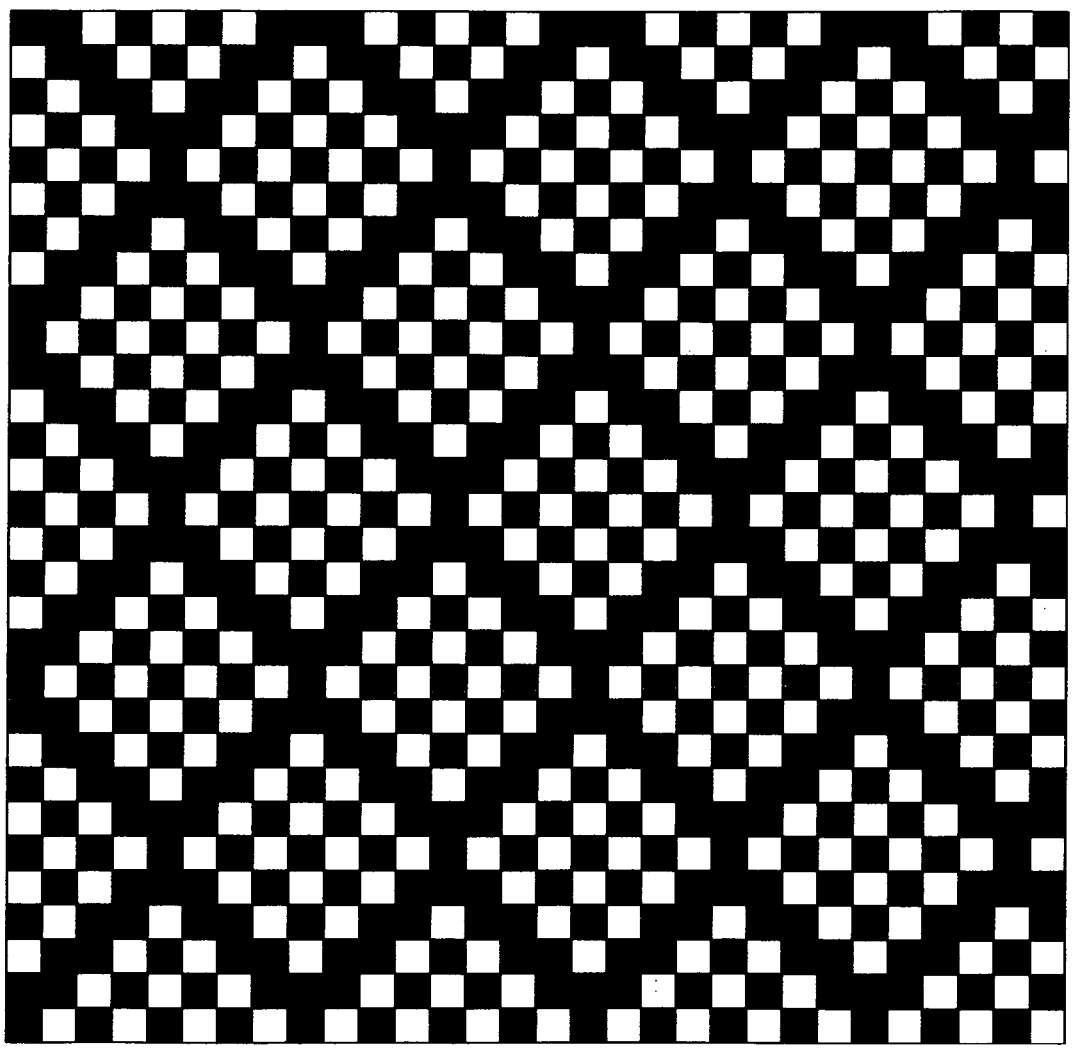
FIG. −7C−

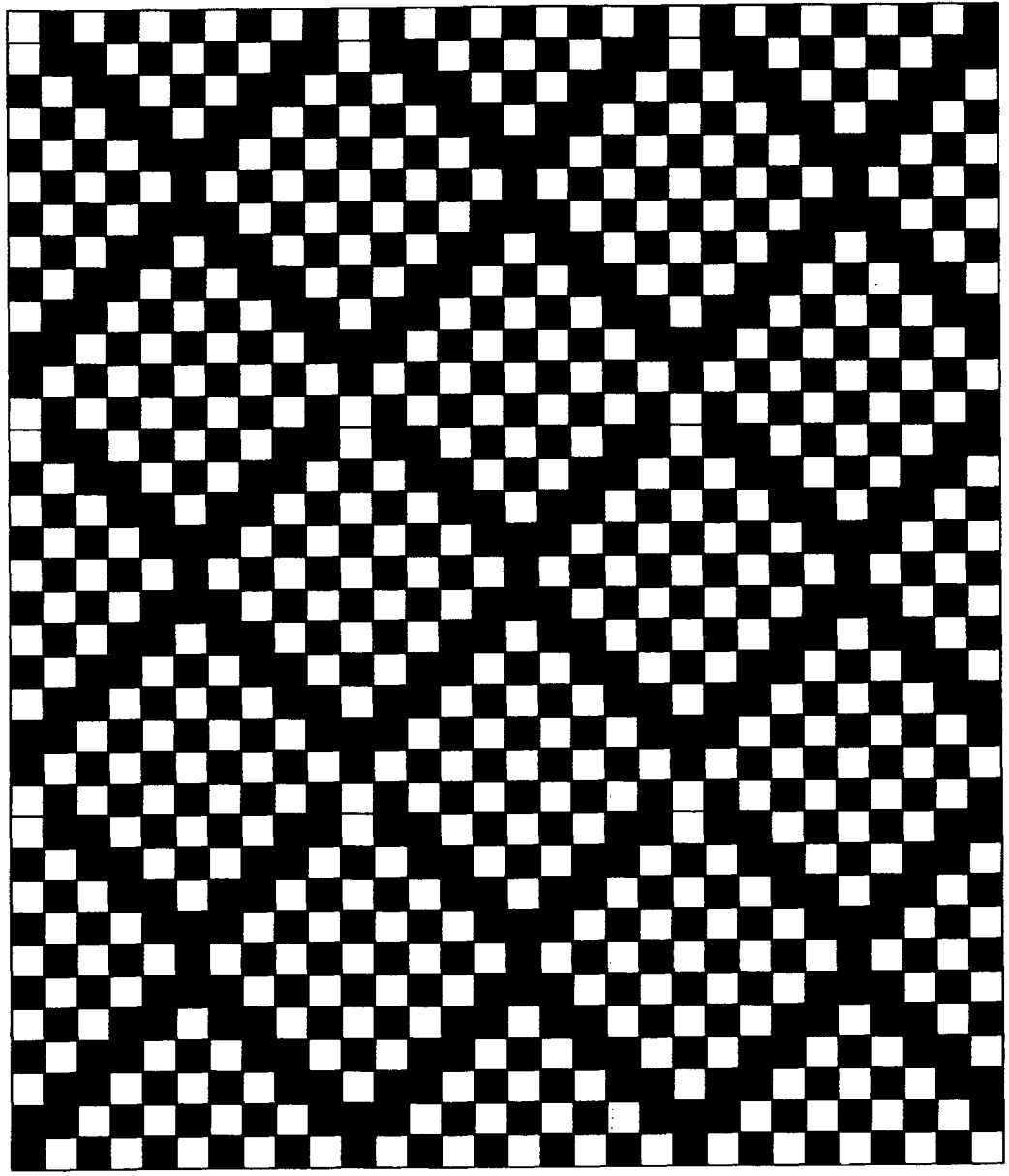
FIG. —7D—

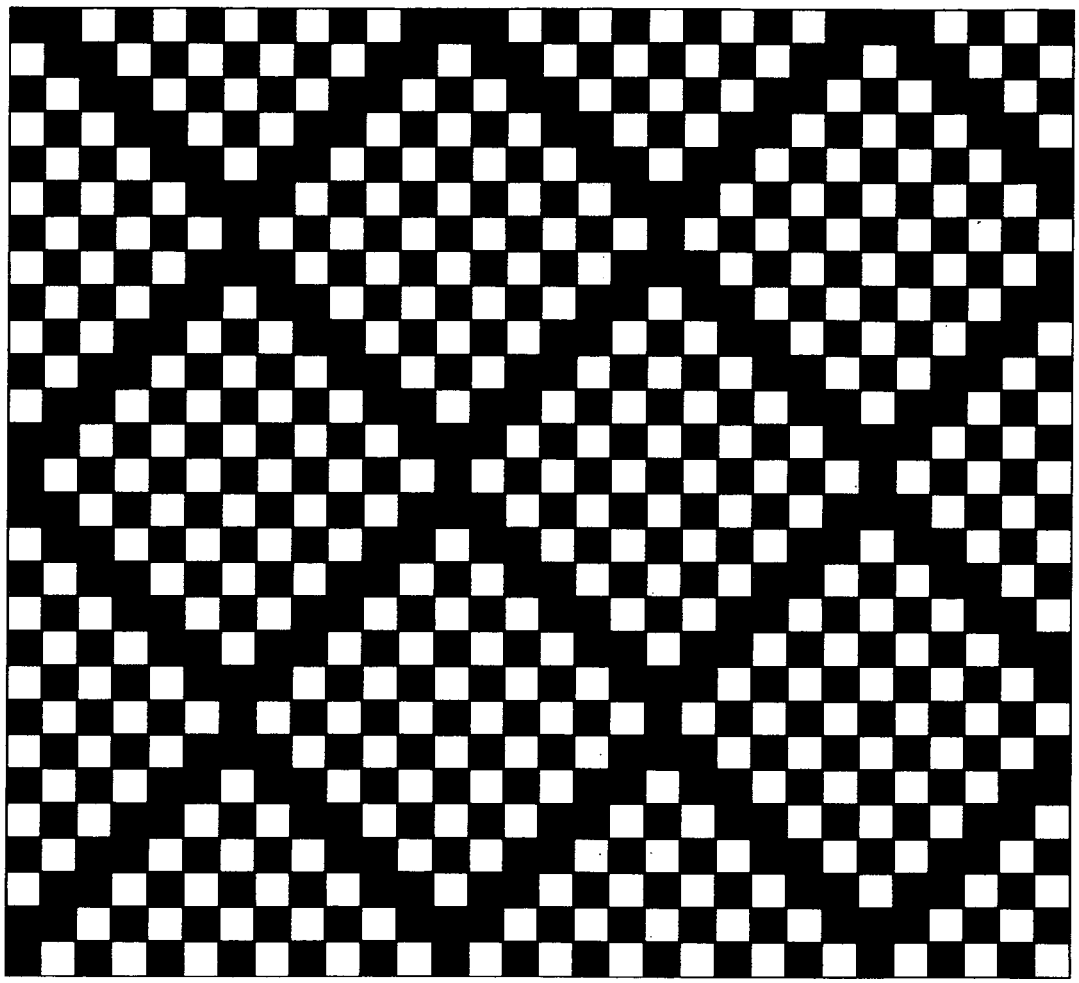
FIG. —7E—

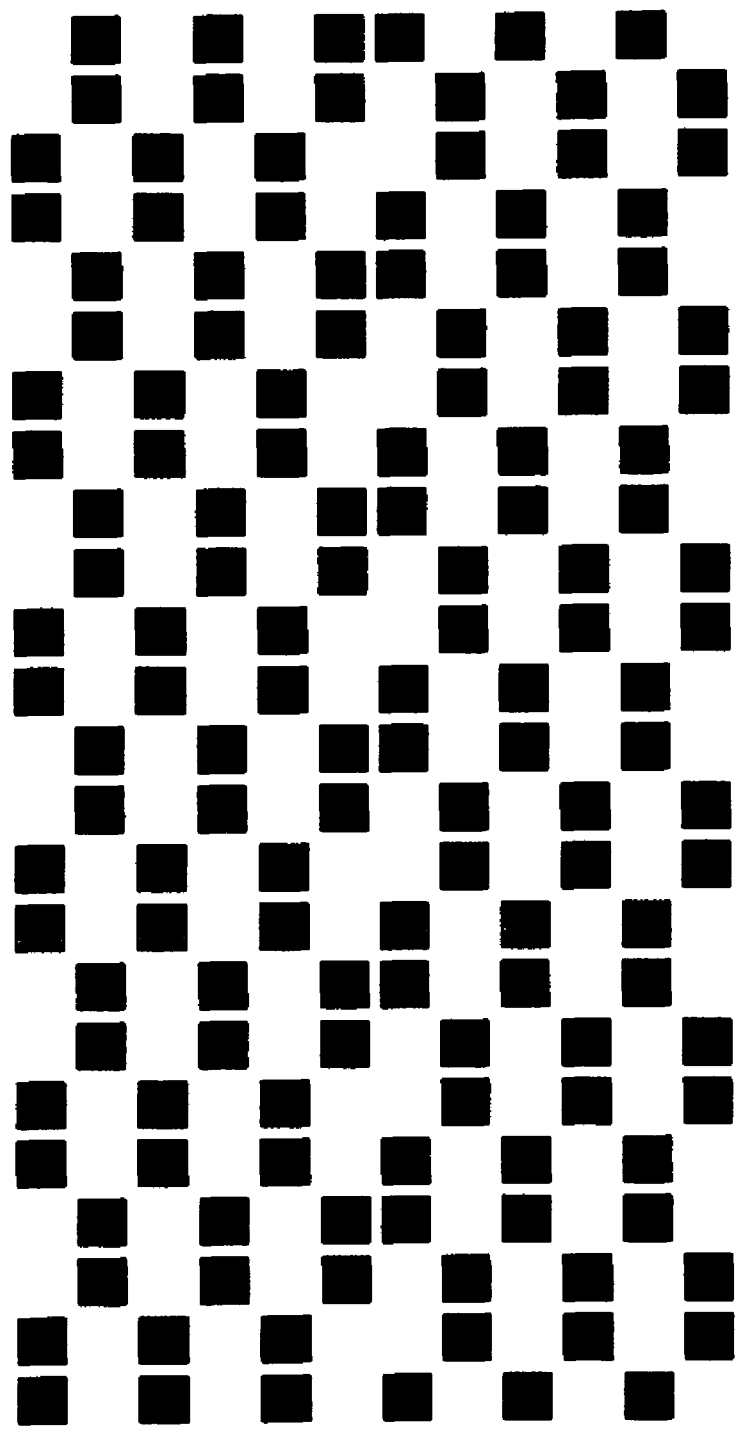
FIG. -8-

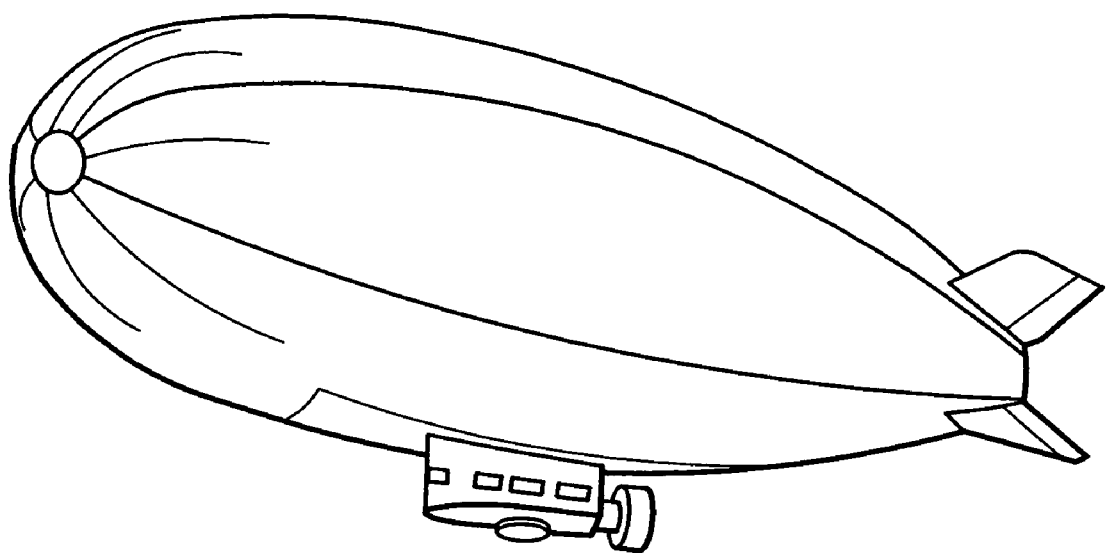
FIG. -9-

FLEXIBLE SHEET-LIKE COMPOSITES

CROSS-REFERENCE TO RELATED APPLICATIONS

This non-provisional application is based on U.S. Provisional Patent Application Ser. No. 60/710,442, filed Aug. 23, 2006, said Application being incorporated by reference herein.

BACKGROUND AND SUMMARY

This disclosure is directed to flexible sheet-like composites comprising a fabric layer and a film layer, and processes for constructing such composites. More particularly, this disclosure describes various flexible sheet-like substrates that are lightweight, rupture or burst resistant, and suitable for use in constructing a variety of structures used in fluid-containment, especially gas containment, and other applications, and the processes by which such composites can be fabricated. In the most general case, the composites of this disclosure are comprised of a woven textile fabric to which has been laminated a flexible film. Two principal embodiments are disclosed: a first embodiment without a reinforcing layer, and a second embodiment with a structurally robust, bias-oriented reinforcing layer, preferably interposed between the fabric and the film. Various alternative constructions applicable to each of these principle embodiments, such as variations in fabric construction details, yarn composition, fabrication techniques, film composition and configuration, etc., are also set forth as part of the respective discussions of each of these embodiments.

Among other aspects, special attention in each embodiment is paid to the matter of (1) evenly loading the individual yarns comprising the textile fabric as a means for providing rupture resistance and dimensional stability (specifically including resistance to skewing forces) to the composite, (2) configuring the layers of the composite to reduce weight without unacceptable loss in strength, and (3) providing means within the laminate structure to allow for the passage of lamination gasses and the flow of adhesive, to assure sufficient bonding between the outer layers of the laminate and thereby provide resistance to de-lamination, particularly whenever the composite structure is subjected to stress. Structures constructed using the composites described herein, which may include, for example, lighter-than-air airships, provide exceptional resistance to bow, bias, and skew as well as a high tear and tensile strength that is uniform across the width and length of the composite substrate and, consequently, any structures made from such composites.

BRIEF DESCRIPTION OF DRAWINGS

The following description can be best understood if read in conjunction with the following drawings, in which:

FIG. 1 depicts, in schematic form, a composite of the kind described herein, without an optional, structurally robust reinforcing layer.

FIG. 1A depicts, in schematic form, the indicated cross-section of the composite of FIG. 1.

FIG. 2 depicts, in schematic form, a composite of the kind described herein that includes a structurally robust reinforcing layer comprised of a scrim material. Note that, in this embodiment, the scrim material is oriented so that at least some of its component yarns, while parallel to each other, form diagonals with respect to the web axis of the composite indicated by the direction of the arrows signifying the direction of the cross-sectional view.

FIG. 2A depicts, in schematic form, the indicated cross-section of the composite of FIG. 2.

FIG. 3 depicts, in schematic form, a composite of the kind described herein that includes a structurally robust reinforcing layer comprised of an apertured film material. Note that, in this embodiment, the apertures of the film are oriented to form diagonals with respect to the web axis of the composite indicated by the direction of the arrows signifying the direction of the cross-sectional view.

FIG. 3A depicts, in schematic form, the indicated cross-section of the composite of FIG. 3.

FIG. 4 depicts a prior art plain weave structure commonly used in fabric/laminate composites. In this and all other weave diagrams herein, white indicates "up" and black indicates "down."

FIGS. 5A through 5C depict prior art basket weave structures in which yarns are allowed to "float."

FIGS. 6A through 6D depict embodiments of a first weave structure ("Paradox") that has been found to yield desirable performance with respect to rupture resistance.

FIGS. 7A through 7E depict embodiments of a second weave structure ("Paradiam") that also has been found to yield desirable performance with respect to rupture resistance.

FIG. 8 depicts yet another weave structure ("Barathea") that has been found to yield desirable performance with respect to rupture resistance.

FIG. 9 schematically depicts a lighter-than-air airship in which the gas-filled body is constructed using a sheet-like composite disclosed herein.

DETAILED DESCRIPTION

General Structure of the Composites

As shown in FIGS. 1 and 1A, the general structure of composites discussed herein is that of a fabric layer 40, a film layer 20, and a layer of adhesive 30 that binds the fabric layer and the film layer into a laminated sheet-like composite. Feature 10 is an optional coating layer or additional film layer that serves to protect film layer 20. FIGS. 2 and 2A, and FIGS. 3 and 3A, depict composites in which a reinforcing layer is interposed between the fabric layer and the film layer, in contact with adhesive layers 32 and 38. In FIGS. 2 and 2A, the reinforcing layer is a scrim 35; in FIGS. 3 and 3A, the reinforcing layer is an apertured film 36. Details of each aspect of these composites, as well as a discussion of fabrication techniques, are set forth in respective sections below, which should be read in conjunction with the following definitions.

The terms "high modulus" and "low elongation" shall refer to yarns that exhibit a high ratio of stress to strain, i.e., yarns that, following the removal of any crimp, exhibit relatively low elongation (i.e., relatively small change in length) when placed under tension.

The term "high tenacity" shall refer to yarns that can withstand relatively high tension (for a given yarn denier) without breaking. A high tenacity yarn exhibits high tensile strength.

The term "rupture resistance" shall refer to resistance to the development of a tear or breach. A range of rupture characteristics are possible, extending from a small rupture involving a very small hole capable of passing only a small amount of fluid over time to a large, visible tear resulting in the rapid and complete discharge of fluid. Such ruptures can be due to yarn breakage, yarn dislocations, or a combination of both.

The term "high strength yarn" shall refer to a yarn that exhibits both high tenacity (i.e., generally about 16 grams/denier or greater) and low elongation.

The term "web axis," as applied to the composites disclosed herein, shall refer to the axis parallel to the long edge of the web comprising the composite.

Fabric Substrate (Structure)

The construction of a laminated fabric/film composite poses issues that are not readily apparent and that can dramatically impact the performance characteristics of the composite. Among such issues are those related to the strength of the composite and the ways in which strength and resistance to stress (for example, tensile strength, torsional rigidity, and rupture resistance) can be compromised in unexpected ways. For example, it has been found that during the lamination process, the fabric is typically pulled out and flattened as it is adhesively placed into contact with a film. If the fabric structure is locked together, relative motion of adjacent yarns within the fabric is limited, and the yarns can shift very little during lamination. Although this might appear to be a desirable condition, the consequence is that any non-uniformity in the fabric structure is transferred to the laminate during lamination, especially for fabrics made with low elongation yarns. As a result, the yarns may not load uniformly when placed under stress, with more stress being applied to certain yarns within a group than other yarns in the group. The yarns subjected to the greater stress will tend to break individually and/or sequentially (as undergoing a rip) during rupture, causing the overall group of yarns to fail.

In contrast, if the fabric structure is purposefully constructed to allow for limited, controlled shifting during lamination, non-uniformities in the fabric can be accommodated, thereby compensating, to a degree, for any local structural weaknesses in the fabric and allowing the stress directed to the yarns to be distributed more uniformly over a group of yarns. The stressed yarns are required to fail or break simultaneously as a group, rather than sequentially as individual yarns. Because of this enhanced stress loading of the fabric structure, the resulting laminate has a higher tensile strength than one in which the yarns of the fabric are allowed to break individually and/or sequentially.

Woven Fabric Constructions

Traditional fabrics used as fabric components in laminates are constructed using a plain weave, such as is schematically represented in FIG. 4. In the plain weave of FIG. 4, the number of crossover points or degree of interlacing is maximized (Note: white is "up" and black is "down"). The over/under pattern produces the tightest weave structure and the yarns within that weave structure have the least likelihood of shifting under stress. However, when low elongation (i.e., high modulus) yarns are used to form such a weave structure, it can be difficult to form a uniformly tensioned warp. As a result, when such yarns are woven in a plain weave, it has been found that the non-uniform tension produces fabrics that exhibit undesirable bow, bias, and skew, and also exhibit significant variability in tear and tensile strength across the width and length of the fabric. Additionally, it has been found that such fabrics are not as strong or rupture-resistant as those fabrics in which the yarns are interlaced in a way that allows the yarns to shift when forces are applied to the fabric as, for example, occurs during lamination.

In contrast, basket weaves are constructed by grouping the yarns with less interlacing. Patterns for a 3×3, 2×2, and 2×1 basket weave are shown in FIGS. 5A, 5B, and 5C, respectively. In these woven structures, the yarns are able to slip or move in the areas of the fabric with less interlacing. During lamination, the looser construction will move, allowing a larger number of the yarns to be loaded evenly, improving tensile strength. However, because the basket weave structure may allow for excessive yarn shifting during the fabric formation and lamination processes, especially where the warp/fill count is unbalanced, the fabric may be difficult to keep straight during the lamination process, and the resulting non-uniformities in yarn positioning may be transferred to the laminated composite. Because the yarns in such patterns typically do not load uniformly when placed under stress, they will tend to break individually and/or sequentially when stressed and, again, result in a relatively weak composite laminate.

As disclosed herein, a solution to this problem lies in combining these two weave patterns to produce a combination weave pattern that exhibits qualities that are characteristic of both plain weave and basket weave fabrics. It has been found that, to a surprising degree, the physical properties described above may be controlled in almost proportional fashion by controlling the contribution of each of the respective weave patterns to the combination. Looking at FIGS. 6A through 6D, the character of the overall fabric becomes more and more that of a plain weave as the relative contribution of the plain weave area increases. Conversely, the character of the fabric of FIG. 6A is much more like that of a basket weave than is the fabric of FIG. 6D, due to the relatively smaller areas occupied by plain weave fabric in the former and the relatively larger areas occupied by plain weave fabric in the latter. Accordingly, the fabrics of FIGS. 6A through 6D and FIGS. 7A through 7E, all of which have clearly discernable plain weave and basket weave aspects, tend to provide the advantages of both (in rough proportion to the representation of each), and consequently are preferred weave styles for the fabric component of the composites disclosed herein.

Ideally, flexible composite structures should be uniform in nature, and, accordingly, the various layers comprising the composite should be uniformly and permanently joined, with no bubbles, wrinkles, or areas in which adhesion between layers is compromised. The problem encountered when a layer of the composite is comprised of a fabric substrate and the yarns in the fabric have shifted during lamination has been discussed above. In that situation, the shifted yarns can introduce unacceptable variability within the substrate, and can severely impair the performance of the substrate. For example, if the substrate is used in the fabrication of a gas-filled airship, such variability can lead to problems with respect to resistance to internal stresses (e.g. those due to inflation pressure) as well as to external stresses (e.g., those due to wind or other environmental conditions). The use of the fabric construction disclosed herein can eliminate such variability by preventing significant yarn shifting during the lamination process.

As disclosed herein, novel variations in traditional plain and basket weave constructions have been developed that allow for compensation for non-uniformly tensioned warp yarns, and result in woven fabrics that have improved bow, bias, and skew, as well as improved tear and tensile strength and strength uniformity, particularly when such fabrics are used as part of a fabric/film laminate composite.

Four embodiments of the set of constructions referred to as "Paradox" are shown in FIGS. 6A and 6D, respectively. The overall weave structure has the appearance of diamond-shaped areas of plain weave surrounded by a border area resembling a basket weave. It is believed the areas of basket weave increase the overall tear strength while the areas of plain weave improve the fabric's integrity and, as discussed above, the relative contribution to each of these characteristics is roughly proportional to the contribution of each of the weave patterns to the overall pattern. The preceding comments concerning the Paradox pattern apply as well to the embodiments of the "Paradiam" pattern shown in FIGS. 7A through 7E. Of these patterns, the Paradox pattern of FIG. 6A is known to provide a laminate with exceptional stability.

An alternative weave pattern, known as "Barathea," is depicted in FIG. 8. In this weave pattern, a periodic skip in a plain weave pattern produces areas where two yarns are grouped together. The Barathea weave pattern is similarly believed to provide improved performance when used in any of a wide variety of composite materials.

The Paradox, Paradiam, and Barathea weave patterns all exhibit sufficient stability to discourage the creation of significant non-uniformities during the manufacturing processes. However, such patterns also achieve a seemingly contradictory feat by sufficiently shifting during the fabric-to-film lamination process to allow the yarns to load more evenly when the fabric is part of the resulting composite structure. As a result, the yarns resist breaking individually when the composite is placed under stress and instead, when stressed to the breaking point as part of the composite, tend to break together as a unit. This behavior gives the composite a significantly higher tensile strength when compared with composites constructed with fabrics using conventional constructions that do not allow for the distribution of stress loading at the time the composite is created, and therefore tend to allow the stressed yarns to fail or break one-by-one.

Additionally, the invented structures can improve tear strength when the yarns can move during the tearing of the laminate. This is believed to be due to increasing the number of yarns that are in position to absorb or dissipate the tearing force—the tear strength improves as the tear point (i.e., the local area within the fabric in which the tearing stresses are concentrated) is forced to cross multiple yarns. In this way, it is believed that the tearing stresses are distributed and partially dissipated, and yarn failure (manifested as fabric rupture) is avoided.

It is contemplated that fabric substrates having other weave patterns can be used in many applications for which the composite structure contemplated herein would be particularly well suited. As discussed below, one such application is the formation of gas-filled lighter-than-air vehicles. For many attributes, there is commonality between substrates used for such vehicles and those suitable for use in automotive restraint systems (i.e., vehicle air bags). Accordingly, it is believed that the woven fabrics disclosed in commonly assigned U.S. Pat. Nos. 5,277,230 and 5,704,402 and 5,921,287, the teachings of which are hereby incorporated by reference, may be used as well (although with somewhat reduced effectiveness).

Fabric Substrate (Fabrication)

Techniques for generating woven fabrics employing the Paradox or Barathea weave patterns will be apparent to those of ordinary skill in the art. It is suggested that high strength yarns, as discussed below, be used in both the warp and fill. In some cases, the strength requirement for the fabric substrate will be greater in one direction than another. In such cases, and in order to conserve weight, a fabric having an unbalanced weave (e.g., one having a greater number of yarns in the warp or fill direction) can be used.

Generally, the above constructions can be implemented using a variety of different yarns to yield acceptable performance. However, the characteristics of certain yarns have been found to yield performance that is generally preferred, although perhaps not uniquely so.

Yarn Composition and Construction

While yarns for use in the fabric component may be selected from a variety of yarn types, generally it is suggested that the yarn have a denier range from about 50 d to about 1500 d, and most commonly having a denier falling within the range of about 200 d to about 500 d. Yarns that meet this criteria include the following: Ultra High Molecular Weight Polyester (Examples: Spectra®, available from Honeywell International Inc., of Colonial Heights, Va.) and Dyneema® (available from DSM N.V., of Geleen, The Netherlands)), Aramid (Examples: Kevlar®, available from E.I. DuPont de Nemours and Company of Richmond, Va.), Twaron® and Technora® (both available from Teijin Twaron BV, of Arnhem, the Netherlands), PBO (Example:Zylon®, available from Toyobo of Osaka, Japan)), Polyarylate (liquid crystal polymer) (Example: Vectran®, available from Kuraray of Charlotte, N.C.), M5 fiber (available from Magellan Systems International of Richmond, Va.), and glass (E-glass or S-2 glass, available from AGY of Aiken, S.C.). It should be understood that this list is not exclusive, and other yarns that provide the physical properties specified above may also be used if otherwise appropriate.

The term "standard yarn" refers to yarns that generally have tenacity values less than 16 grams/denier. Such yarns that can be used include those made from polyethylene terephthalate (PET), polyamide (e.g., nylon), polypropylene (PP), other synthetic (man-made) fibers, and certain natural (e.g., cotton) fibers. It should be noted that yarns made from these fibers typically do not exhibit sufficiently high tenacity to function as the only load bearing yarns in the fabric component of the composite. However, it should also be noted that the standard yarn should be one having a higher modulus, for example, above about 300 prams/denier, (i.e. allowing for a lower degree of elongation under stress before failure), thereby providing the resulting structure with the ability to shift the relative position of yarns within the structure in response to the application of forces incurred during the fabrication of the fabric/film composite, and thereby provide the composite with enhanced resistance to stretching and tearing.

The selected yarns may be of the filament, spun, or staple type, although filament is preferred—particularly for the high strength yarns—because, unlike spun or staple yarns, it is uniform (and exhibits uniform strength) over extended lengths. Twist levels for such filament yarns are preferably adjusted to accommodate the specific yarn type and denier selected. Care must be taken to avoid degradation of the strength of the individual high strength yarn bundle. For example, Vectran® yarns of 200 d were twisted at 3.5 turns/inch, while Vectran® yarns of 750 d were twisted at 2.5 turns/inch, with both showing good strength. It is believed that no crimping, texturing, or other yarn modification process is necessary to enhance the functional aspects of the resulting fabric component or the composite constructed from such fabric component. In fact, it is believed that having crimp in the yarns comprising the fabric actually degrades its elongation performance because the crimp provides a "built-in" source of yarn extension as the yarn straightens under stress.

Film

Film Composition and Construction

A variety of suitable films may be used to form the fabric/film laminate described herein. The film can be made from a single resin, by combining two or more resins in a blend, or by applying two or more resins in a multilayer film. They can be formed by (co)extrusion, (co)molding, deposition or coating from a solvent or latex, or other methods well-known in the art. Many commercial resins can be used, including, but not limited to: acetal, polyacrylonitile, acrylonitrile-methyl acrylate (AMA) copolymer, cellulosic plastic (Cellophane), fluoroplastics (such as ethylene-chlorotrifluoroethylene (ECTFE) copolymer, ethylene-tetrafluoroethylene copolymer (ETFE), fluorinated ethylene-propylene (FEP) co-polymer, perfluoroalkoxy resin (PFA), polychlorotrifluoroethylene (CTFE), polytetrafluoroethylene (TFE), polyvinyl fluoride (PVF), and polyvinylidene fluoride (PVDF)), ionomer (ethylene methylacrylate), parylene (polyparaxylylene), polyamide (amorphous nylon, nylon 6, nylon 6,6, nylon 6/6,6, nylon 6,6/6,10, nylon MXD6), polycarbonate, polyester (polybutylene terephthalate (PBT), polyethylene naphthlate (PEN), polyethylene terephthalate (PET), glycol modified polycyclohexylenedimethylene terephthlate (PCTG), polycyclohexylenedimethylene ethylene terephthalate (PETG), liquid crystalline polyester (Vectra®), polyimide (Kapton®), polyolefin (polyethylene (PE), low density polyethylene (LDPE), linear low density polyethylene (LLDPE), ultra low density ethylene-octene copolymer (ULDPE), medium density polyethylene (MDPE), high density polyethylene (HDPE), ethylene-alpha olefin copolymer (POP, Affinity®), ethylene vinyl acetate copolymer (EVA), ethylene vinyl alcohol (EVOH) copolymer, polyethylene acrylic acid (EAA), polyethylene-ionomer (PE-ionomer, Lucalen®), polypropylene (PP), polypropylene copolymer (PP copolymer, Novolen®), polybutylene, polymethylpentene (PMP)), polyphenylene sulfide (PPS), polysulfone (PSO), polyvinyl alcohol (PVA), styrenic resin (acrylonitrile-butadiene-styrene (ABS) copolymer, acrylonitrile-styrene-acrylate (ASA) copolymer, polystyrene (PS), styrene-acrylonitrile (SAN) copolymer, styrene-butadiene block copolymer, vinyl resins (polyvinyl chloride (PVC), polyvinyl chloride-polyvinylidene chloride (PVC-PVDC) copolymer, polyvinylidene chloride (PVDC), thermoplastic alloys (polyethylene/polystyrene (PE/PS) alloy, thermoplastic elastomers (olefinic thermoplastic elastomer (TPO), polyamide thermoplastic elastomer (polyamide TPE), polybutadiene thermoplastic elastomer (Polybutadiene TPE), polyester thermoplastic elastomer (Polyester TPE), thermoplastic polyester-polyurethane elastomer (TPAU), thermoplastic polyether-polyurethane elastomer (TPEU), thermoplastic polycarbonate-polyurethane elastomer (TPCU), styrenic thermoplastic elastomer (Styrenic TPE), and polyvinyl chloride polyol thermoplastic elastomer (pPVC), acrylic rubber (ethylene-acrylate copolymer), polybutadiene rubber, butyl rubber (isobutylene-isoprene copolymer rubber (IRR), bromoisobutylene-isoprene copolymer rubber (BIIR), chloroisobutylene-isoprene copolymer rubber (CIIR), isobutylene rubber, chlorosulfonated polyethylene rubber (CSM), polyepichlorohydrin rubber (CO), polyepichlorohydrin copolymer rubber (CO copolymer), ethylene-propylene copolymer rubber (EPM), ethylene-propylene-diene copolymer rubber (EPDM), fluoroelastomer (vinylidene fluoride-hexafluoropropylene copolymer), natural rubber, polychloroprene neoprene rubber, acrylonitrile-butadiene copolymer rubber, polyisoprene rubber, polysulfide rubber, polyester polyurethane, polyether polyurethane, polycarbonate polyurethane, propylene oxide rubber, silicone rubber, methylvinylfluorosilicone (FVMQ) rubber, and styrene-butadiene copolymer rubber (SBR)).

The preferred materials for a single-layer film are polyimide, polyamide, and polyester. Especially preferred are polyimide, nylon 6, nylon 6,6, nylon MXD6, and polyethylene terephthlate. It should be noted that, in certain applications (such as the airship application described herein), films having low gas permeability are preferred. It should also be noted that use of a high strength, oriented film will contribute substantially to the strength of any overall composite in which that film is a component.

Film Configuration

The film layer in a composite of the kind contemplated herein can perform several somewhat independent functions as part of the fabric/film composite. Among these functions are the following (a non-exhaustive list):
 (a) gas impermeability, particularly useful in cases where the fabric/film laminate is to be used in applications (e.g., use as an airship, use as a balloon, etc.) in which the laminate is used to contain a gas, and especially one having a relatively low molecular weight (e.g., hydrogen, helium, oxygen, air, etc.);
 (b) tear and tensile strength, particularly in directions other than along principal axes of the fabric (e.g., directions other than in the warp and fill directions of a woven fabric, etc.);
 (c) enhanced thermal control of the substrate; and
 (d) protection of underlying surfaces from ultraviolet light, ozone, scratches, etc.

For certain applications, it may be desirable to use an additional film layer as a reinforcing layer. In that case, an additional and important function is providing for the transport of trapped gases, solvents, and moisture to prevent delamination between the various film layers, particularly in cases where the film is laminated to another film layer as a reinforcing or barrier layer (which is preferred when, for example, the composite will be subjected to temperature and/or pressure cycling). Details of that embodiment (i.e., use of one or more additional film layers as reinforcements for composite) are discussed in greater detail below.

Film Coating(s)

If desired, various coatings may be applied to the film prior to or following the formation of the composite. For example, silicon oxide may be applied to the film to provide a barrier against the migration of low molecular weight gases such as hydrogen or helium through the film. Examples of other inorganic materials include metals such as aluminum, titanium, vanadium, chromium, manganese, stainless steels, cobalt, nickel, copper, zinc, molybdenum, palladium, silver, gold, tin, antimony, tantalum, tungsten, and platinum, and various metal oxides (e.g., silicon oxide, titanium oxide, aluminum oxide). These materials can be deposited via evaporation, sputtering, chemical vapor deposition, electrolytic deposition, and electro-less deposition. Other, organic coatings found to be effective for this purpose include polymers such as ethylene vinyl alcohol (EVOH) and polyvinylidene chloride (PVDC). Other preferred polymeric coating materials include fluoroplastics such as, for example, PVDF and PVF, among others. The polymer film can also be coated with a film of a metal or metal oxide.

Preferred coating materials are aluminum, aluminum oxide, and silicon oxide.

It is foreseen that, in some military applications, non-metallic films or film coatings may be preferred if an attenuated reflected electromagnetic signature is desired.

Adhesive Layer

Suitable adhesives may be categorized as non-crosslinked and crosslinked. Non-crosslinked adhesives remain solvent-soluble or re-meltable after the materials have been bonded together. Examples include: starch and derivatives, asphalts, cellulosics, and proteins, acrylates such as ethylene ethyl acrylate (EEA) and ethylene methyl acrylate (EMA), vinyls such as ethylene vinyl acetate (EVA) and polyvinyl alcohol, polyamides, polyesters, polyolefins such as polyethylene and polypropylene, polyurethanes, rubber elastomers such as isoprene, neoprene, polyisobutylene, and butyl rubber, and styrene copolymers such as styrene-isoprene-styrene (SIS) and styrene-butadiene-styrene(SBS).

In contrast, crosslinked adhesives become solvent-insoluble and infusible after curing. Crosslinking may involve the reaction of two different intermediates like formaldehyde condensed with phenol, resorcinol, urea, or melamine, isocyanate reacted with polyol or amine, epoxide reacted with primary amine or polyamide-amine, unsaturated polyester copolymerized with styrene, and sulfur-vulcanized diene rubbers. Crosslinking may also take place among single species like epoxide catalyzed by tertiary amine, dimethacrylate or other dienes that self-catalyze and polymerize under anaerobic conditions, and peroxide-vulcanized rubbers. Examples of crosslinking adhesives include isocyanate prepolymers (e.g. polyether or polyester or polycarbonate polyols reacted with excess aromatic diisocyanate to yield polyurethane-ureas), silicones, polysulfides, unsaturated polyesters, cyanoacrylates, and epoxy resins.

Adhesives which are generally preferred, both in bonding the fabric layer to the film layer and bonding each to an optional reinforcing layer (where used), are isocyanate prepolymers, silicones, unsaturated polyesters, and epoxy resins. Among this group, isocyanate prepolymers, unsaturated polyesters, and epoxy resins appear to be preferable over silicones, with isocyanate prepolymers appearing to be generally preferable overall.

Reinforcement Layer

Fabric/film composites constructed in accordance with the above teachings exhibit a relatively high degree of high-strength and low elongation performance. However, if further increases in such performance are desired, there are several approaches that can be pursued. For example, one can change the physical properties of the fabric, film, or adhesive used or use multiple layers of fabric or film, perhaps with an application of adhesive between each layer. In cases where the fabric or film has already been selected and strength of the composite remains an issue, further layers can be added to the composite, but with an accompanying, and often undesirable, addition of stiffness or weight to the resulting composite.

Alternatively, one can add a layer that is specifically designed to increase the tensile strength, the elongation performance, or other desired physical property (e.g., torsional resistance) of the resulting composite. Such layer can be attached to the composite, either on the fabric side, the film side, or, preferably in most cases, interposed between the fabric and the film, forming a separate, intermediate layer. The addition of this reinforcing layer defines the second of the two principal embodiments disclosed herein.

While the reinforcing layer may take the form of an additional layer of fabric, it has been found that doing so leads to an increase in weight, and also results in the presence of seams or splices in the web direction of the laminate. This latter condition is due to the need to have the warp yarns of the reinforcing woven fabric layer extending diagonally across the web axis of the laminate for the reasons discussed below. Presumably, the warp yarns in the initial fabric layer would provide significant (although not necessarily satisfactory) stability in the web direction during the lamination process. Therefore, in order to impart torsional or anti-skewing stability to the laminate, it is likely that the fabric reinforcing layer would be oriented to allow the warp yarns to provide that needed stability (which would be nearly absent if the initial fabric layer were the only source of such stability). Doing so requires that the web of reinforcing fabric (in which the strong warp yarns are oriented in the web direction) be cut at intervals and re-oriented on the laminate web to direct the strong warp yarns to extend diagonally across the width of the web, more in line with potential skewing forces. Providing a continuous reinforcing layer would therefore require the splicing or joining of the individual sections of reinforcing fabric, which produces the unwanted result of bulk as well as seams that are, at least potentially, the weakest area of the reinforcing layer. There is also the issue of maintaining the flow of adhesive and of the gases generated during the lamination process—impeding either is undesirable and can lead to discontinuities in the finished laminate that are particularly subject to rupture.

As a superior alternative to the use of a reinforcing fabric layer, the reinforcing layer may take the form of a scrim comprised of one or more of the high strength yarns described above. The relatively open weave of the scrim provides particularly effective flow of adhesive across the thickness of the interior of the composite, thereby firmly securing the two outside layers of the composite to each other via a matrix of adhesive. The scrim can be formed using the following construction techniques, using high strength yarns.

Any of several techniques for generating a satisfactory scrim material may be used. For instance, one can make a tri-directional scrim from braid yarns, where braided yarns extend along diagonal directions with respect to the laminate web to impart torsional stability and standard yarns are aligned in the web direction to impart tensile stability, and where the standard and braided yarns are glued to one another at their intersections. Equipment to fabricate such a braided scrim is manufactured by A & P Technology of Cincinnati, Ohio. Alternatively, a suitable scrim can be fabricated using "warp" yarns aligned in the web direction, with a side-to-side meandering yarn being "laid in" to provide a fill yarn that is adhesively attached to the warp yarn at crossing points. As a further alternative, a tube may be woven with a very open weave (i.e., with warp and fill yarns well spaced apart and attached to each other at crossing points) and subsequently slit along the bias to produce a scrim having yarns that extend diagonally and thereby resist torsional deformations. It should be noted that in all of the above cases, the resulting scrim may be made as long as desired without the need for splicing or seaming, thereby eliminating a source of certain weight and bulkiness, and potential rupture. It should also be noted that, provided the scrim is relatively open in nature, the necessary flow of gases and adhesive within the laminate structure is unimpeded.

Following fabrication of the scrim, the scrim is positioned and secured within the composite, preferably by laminating the scrim to the film prior to the attachment of the film to the fabric. In certain applications, discussed in more detail below, it is desirable to orient the scrim at about a 45° angle with respect to the web direction of the composite in order to maximize the resistance of the composite to torsional or skew-inducing stresses.

An alternative approach to providing a reinforcing layer in or near the middle of the composite is through the use of one or more additional film layers that are made a part of the composite, preferably by attachment (e.g., via lamination) to the film layer that already constitutes a layer of the composite. Preferably, the film used for such reinforcing purposes is perforated or apertured, having readily visible holes to allow for the transport of trapped gases, solvents, and moisture that may be released during lamination and that might otherwise contribute to de-lamination. It is also desirable that the apertures be sized sufficiently to allow for the flowing of adhesives across the reinforcing layer, thereby enhancing the physical bonding between the inner-most surfaces of the outermost layers of the composite. Such perforations can be in the form of macro-perforations (i.e., apertures having an area greater than about 0.002 sq. in., equivalent to a circular aperture having a diameter of about 0.05 inches) or micro-perforations (i.e., apertures having an area of about 0.002 sq. in. or smaller). Care should be taken in sizing the apertures that (1) the apertures are not so large that the tensile, torsional, and shear strength of the reinforcing layer is compromised and (2) the apertures are not so small that the ability to transport gases from between the film layers is compromised, thereby promoting the formation of undesirable bubbles in which the various layers are not bonded to one another, and (3) the apertures allow for the flow of adhesive across the thickness of the layer. The composition of this reinforcing film layer may be the same as, or different from, the original film layer comprising the composite.

The size and placement of holes or apertures in the reinforcing film layer should be designed to provide the necessary transport, but with minimal impairment of the physical integrity and strength of the layer. By use of such apertured reinforcing film layer, control of gas permeability through the overall composite structure will also be enhanced through the positioning of two (or more) layers of film throughout most of the composite (all, except for the areas containing the holes). It is also believed that, unlike use of scrim material that presents on-axis reinforcement along only a limited number of directions (e.g., along the axes of the yarns comprising the scrim—the machine direction, one or two diagonals, and perhaps the cross-machine direction), an apertured film is capable of presenting nearly isotropic (in-plane) reinforcing characteristics (depending, of course, on the size and configuration of the apertures), thereby providing "on-axis"-type strength for stresses at substantially any angle.

The size, shape, and location of the holes in the apertured film can be tailored to individual applications, although it has been found that the holes or apertures should constitute at least 5% of the surface area of the film, and the distance between the edges of any two adjacent holes should be at least 0.05 inches. For example, holes of about 0.1 inch in diameter may be placed about 0.5 inches apart with good effect. Holes that are larger or smaller may be used, so long as the strength and vapor transmissivity considerations discussed above. Aperture shape becomes less important if the apertures form a relatively small percentage of the surface area of the film. As that percentage increases, the aperture shape should be configured with consideration for the tension, torsional, and shear strength of the film. If it is intended that the strength of the film be substantially isotropic, a preferred shape for the aperture is circular, as that shape makes the direction of the stress in relation to the edge of the aperture constant. In addition to aperture size and shape, hole spacing may be adjusted, so long as adequate venting of gases is not compromised.

As mentioned above, an additional consideration regarding hole size in an apertured film, or in any other reinforcing layer that is to be interposed within the composite between the two outside layers, is providing for the even distribution of adhesive within the composite structure, and particularly between the inside surfaces of the top-most and bottom-most layers. If the adhesive used to laminate and bond these outside layers together cannot flow across the thickness of the composite structure and assure a uniform bond between the various layers comprising the composite (and, preferably, joining the respective outermost layers via a substantially continuous matrix of adhesive into which any intermediate layer(s) are embedded), then the risk of local de-lamination is significantly increased, perhaps to the level that, for certain applications (e.g., gas-inflated airships), that particular composite construction is no longer an acceptable fabrication choice.

The holes may be formed in the film via needle punching or any other technique wherein holes of the requisite size, shape, and spacing may be produced. While it is expected that the holes may be uniform in spacing and arrangement on the layer, other configurations of holes (e.g., random, but with a minimum hole density per unit area of film and observance of a minimum hole distance) may be acceptable.

Fabrication of Flexible Composite Structures

The lamination process requires that the fabric be uniformly positioned and properly tensioned, that the adhesive used be uniformly and repeatably applied, that the pressure applied to the composite be of the proper magnitude, uniformity, and duration to result in a satisfactory bond, and that a proper curing process is undertaken (e.g., appropriate temperature, relative humidity, duration, etc.).

Ideally, the flexible composite structures of the type disclosed herein should be uniform in nature, and, accordingly, the various layers comprising the composite should be uniformly and permanently joined, with no bubbles, wrinkles, or areas in which adhesion between layers is compromised. The problems that can be encountered when a layer of the composite is comprised of a fabric substrate and the yarns in the fabric have shifted during lamination, or when a layer has been spliced, or when gases generated by the lamination process become trapped within the composite in a way that forms bubbles or wrinkles, have been discussed above. The use of the fabric constructions disclosed herein can eliminate such variability by preventing significant yarn shifting during the lamination process, and the use of scrim- or film-type reinforcing layers of the kind disclosed herein can result in a laminate with superior resistance to stresses, whether tensional or torsional in nature.

EXAMPLES

The following Examples are intended to be representative and illustrative only, and are not intended to limit the scope of the appended claims.

Example 1

200 d Vectran® yarn was obtained from Kuraray Corp. of Charlotte, N.C. The yarn was twisted with a Murata (Japan) 2/1 twister at 3.5 turns per inch. The yarn was warped with 65 ends per inch (epi). The beam was tied into a Dornier 210 EDU rapier weaving machine and woven with 56 picks per inch (PPI) in plain, Barathea, Paradox 5, and Paradox 11 weave patterns. The woven fabric was laminated on a 16" Series 300 Geometric Coating machine. The twin roll coater applied 0.6 mil of reactive hot-melt polyether polyurethane adhesive, Rapidex™ NP-2075T, from H B Fuller Inc., of Minnesota, to 1 mil Kapton® HPPST polyimide film (Dupont, Del.). After approximately a 5-10 second travel to the calendar roll laminator, the film was laminated to the 200 d Vectran® fabric. The adhesive cured for 3 days under ambient conditions. The laminates were tested for strip tensile (ASTM D5035) and tongue tear (ASTM D2261). The results were as follows:

|  | Strip Tensile | | Tongue Tear | |
| --- | --- | --- | --- | --- |
| EPI/PPI - Style | Warp Lbs./in | Fill Lbs./in | Warp Lbs./in | Fill Lbs./in |
| 65/56 Plain | 650 | 599 | 27 | 25 |
| 65/56 Barathea | 680 | 633 | 55 | 59 |
| 65/56 Paradox 11 | 647 | 632 | 33 | 29 |
| 65/56 Paradox 5 | 707 | 574 | 42 | 32 |

Example 2

40 cotton count, 2-ply Kevlar® yarn was obtained from Pharr Yarns, of Charlotte, N.C. Woven samples using plain and Paradox 5 weave pattern with 75 ends per inch (epi) and 68+/−2 picks per inch (ppi) were woven on a Dornier 300 rapier weaving machine. A 2 mil PET film from Pilcher Hamilton was coated with 7 mil of Loctite epoxy QM-50 81501, and the woven fabrics were pressed into the adhesive and allowed to cure overnight under ambient conditions. The laminates were tested for strip tensile performance following ASTM D5035. Plain weave laminated sample showed an average of 300 lbs peak force compared to the Paradox 5 laminated sample average of 325 lbs peak force.

Fabrication of Airship Structures Using Laminated Composites

A specific application to which the composite substrates described herein are useful is in the construction of an inflated, gas-filled airship, such is as depicted in FIG. 9. Such structures are characterized by large enclosed volumes, a relatively aerodynamic shape, and the need to be completely moisture and gas impermeable when in use. Typically, such airships use hydrogen or helium to provide buoyancy, and the selected substrate must provide an effective barrier to migration of such low molecular weight gases through the substrate. Additionally, the substrate must be light in weight, provide resistance to longitudinal, radial, and rotational or torsional deformation as well as rupture when the structure is inflated and in use, e.g., when being stressed by air currents or other forces, and be relatively immune to the effects of various environmental conditions such as degradation from ultraviolet radiation or sunlight, ozone, acid rain, and changes or extremes in temperature. As a practical consideration, the substrate must be capable of being seamed in a way that is both efficient and effective (e.g., resists separation, is gas-tight, etc.).

It is believed the composite structures disclosed herein have a unique combination of properties that meet all of the foregoing requirements. In particular, for such applications, it is suggested that a reinforcing layer be used within the composite material. It is further suggested that, if the reinforcing layer has an orientation (e.g., if a scrim, the orientation of the scrim elements; if an apertured film, the orientation of the apertures, etc.), the reinforcing layer should be positioned within the composite to provide a reinforcing layer orientation of about 45° from the major longitudinal axis of the composite (i.e., the "machine direction" of the composite fabrication line) in order to maximize the degree to which the reinforcing layer will provide torsional rigidity and thereby prevent any twisting of the airship body around the long axis of the airship.

We claim:

1. A laminated flexible sheet-like composite substrate comprising, in order:
   a woven fabric layer comprising diamond-shaped areas being woven in a plain weave and border areas surrounding the diamond-shaped areas being woven in a basket weave;
   an adhesive layer; and,
   a film layer, wherein the adhesive layer is in contact with the fabric layer and the film layer, and wherein said film is coated with an organic coating.

2. The substrate of claim 1 wherein said fabric layer is comprised of woven yarns in a Barathea pattern.

3. The substrate of 1 wherein said film is comprised of at least one resin selected from the group consisting of polyimide, polyamide, and polyester.

4. The substrate of claim 1 wherein said adhesive layer is comprised of a crosslinked adhesive.

5. The substrate of claim 4 wherein said crosslinked adhesive is selected from the group consisting of isocyanate prepolymers, silicones, polysulfides, unsaturated polyesters, cyanoacrylates and epoxy resins.

6. The substrate of claim 1 wherein said composite comprises a separate reinforcing layer.

7. The substrate of claim 6 wherein said reinforcing layer is continuous, and is positioned between said film layer and said fabric layer.

8. The substrate of claim 7 wherein said reinforcing layer is capable of resisting de-lamination by transporting trapped gasses, solvents, and moisture that may be released during lamination.

9. The substrate of claim 7 wherein said reinforcing layer is capable of allowing an adhesive to flow through said reinforcing layer between said fabric layer and said film layer.

10. The substrate of claim 9 wherein said substrate is configured in the shape of an airship.

11. The substrate of claim 9 wherein said reinforcing layer is comprised of a scrim.

12. The substrate of claim 11 wherein said scrim has an orientation of about 45 degrees from the web direction of the composite.

13. The substrate of claim 12 wherein said substrate is configured in the shape of an airship.

14. The substrate of claim 9 wherein said reinforcing layer is comprised of a perforated film.

15. The substrate of claim 14 wherein said film reinforcing layer contains micro-perforations.

16. The substrate of claim 14 wherein said film reinforcing layer contains macro-perforations.

17. The substrate of claim 14 wherein the perforations in said perforated film constitute at least 5% of the surface area of the film.

18. The substrate of claim 14 wherein said substrate is moisture and gas impermeable and is configured in the form of an airship.

19. A laminated flexible sheet-like composite substrate comprising, in order:
   a woven fabric layer comprising diamond-shaped areas being woven in a plain weave and border areas surrounding the diamond-shaped areas being woven in a basket weave;
   an adhesive layer; and,
   a film layer, wherein the adhesive layer is in contact with the fabric layer and the film layer, wherein said film is coated with an inorganic coating.

20. The substrate of claim 19 wherein said inorganic coating is selected from the group consisting of aluminum, aluminum oxide, and silicon oxide.

* * * * *